(12) United States Patent
Schorr et al.

(10) Patent No.: US 10,371,494 B2
(45) Date of Patent: Aug. 6, 2019

(54) AUTOMATED DETERMINATION OF ROCKET CONFIGURATION

(71) Applicant: BAE SYSTEMS Information and Electronic Systems Integration Inc., Nashua, NH (US)

(72) Inventors: David J. Schorr, Austin, TX (US); Matthew F. Damiano, Somerville, MA (US); James H. Steenson, Jr., New Boston, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 401 days.

(21) Appl. No.: 15/357,407

(22) Filed: Nov. 21, 2016

(65) Prior Publication Data

US 2018/0142997 A1     May 24, 2018

(51) Int. Cl.
*F42B 15/01* (2006.01)
*F42B 35/00* (2006.01)
(Continued)

(52) U.S. Cl.
CPC .............. *F42B 15/01* (2013.01); *F42B 15/08* (2013.01); *F42B 35/00* (2013.01);
(Continued)

(58) Field of Classification Search
CPC ............ B64C 39/024; B64C 2201/082; B64C 2201/185; B64C 2201/027;
(Continued)

(56) References Cited

U.S. PATENT DOCUMENTS

| 8,798,813 B2 | 8/2014 | Casado et al. |
| 2011/0313715 A1 | 12/2011 | Robillard et al. |

(Continued)

FOREIGN PATENT DOCUMENTS

EP     0456412 B1     11/1991

OTHER PUBLICATIONS

ESA, "ESA User Guide to Low Gravity Platforms", European Space Agency, 2014, Chapter 6 (Year: 2014).*
(Continued)

*Primary Examiner* — Aniss Chad
*Assistant Examiner* — Faraj Ayoub
(74) *Attorney, Agent, or Firm* — Finch & Maloney PLLC

(57) ABSTRACT

Techniques are provided for automated determination of a rocket configuration based on acceleration during rocket motor burn-out and temperature. The rocket configuration is associated with a class of warhead affixed to the rocket. A methodology implementing the techniques according to an embodiment includes measuring the acceleration of the rocket over a period of time associated with the flight of the rocket. The method also includes calculating an acceleration difference between the measured acceleration associated with the start of rocket motor burn-out and the measured acceleration associated with the end of rocket motor burn-out. The method further includes measuring an internal temperature of the rocket and selecting a delta acceleration threshold based on the measured temperature. The method further includes comparing the calculated acceleration difference to the selected delta acceleration threshold, to estimate the rocket configuration. The estimated rocket configuration is used by guidance and control circuitry to select autopilot parameters.

17 Claims, 9 Drawing Sheets

(51) Int. Cl.
*F42B 15/08* (2006.01)
*G06F 17/50* (2006.01)
(52) U.S. Cl.
CPC .... *G06F 17/5086* (2013.01); *B64C 2201/027* (2013.01); *B64C 2201/082* (2013.01); *G06F 2217/16* (2013.01)
(58) Field of Classification Search
CPC .... B64C 2201/042; F42B 15/00; F42B 15/01; F42B 35/00; F42B 15/08; G06F 17/5086
USPC .......................................................... 703/2
See application file for complete search history.

(56) References Cited

U.S. PATENT DOCUMENTS

| | | | |
|---|---|---|---|
| 2012/0316823 A1* | 12/2012 | Africa, Jr. | G01P 15/16 702/141 |
| 2015/0247714 A1 | 9/2015 | Teetzel et al. | |
| 2016/0041196 A1* | 2/2016 | Frey, Jr. | G01P 5/02 702/142 |

OTHER PUBLICATIONS

Tom Benson, "Rocket Translation", NASA, 2014 (Year: 2014).*
International Search Report, PCT/US2017/062545, 6 pages, dated Aug. 27, 2018.

* cited by examiner

AUTOMATED DETERMINATION OF ROCKET CONFIGURATION

FIELD OF DISCLOSURE

The present disclosure relates to automated determination of a rocket configuration, and more particularly, to automated determination of a rocket configuration based on measurements of acceleration and temperature.

BACKGROUND

Rockets are often designed with the capability to deliver different types or classes of warheads. The warheads may be attached, interchangeably, to the rocket at the start of a mission or at any time prior to launch, with the choice based on the specific requirements of the mission. Each class of warhead will typically exhibit different physical characteristics such as, for example, mass and aerodynamic properties. Furthermore, there are many different warheads from various sources without extensive standards in configuration and options. Flight parameters are dependent on these properties, and as such, the rocket guidance and control systems need to determine which warhead has been attached. One solution to this problem is to provide an additional external switch on the rocket (or re-purpose an existing switch), which could be set by the personnel that configure the warhead to the rocket. The switch setting can identify the warhead and thus define the rocket configuration. This approach is undesirable, however, because each additional switch that is provided increases the possibility of operator error, and the repurposing of an existing switch may result in some loss of functionality associated with that switch. Furthermore, such an approach requires manual operation, and it is generally desirable to minimize such manual techniques, especially during combat situations.

SUMMARY

One example embodiment of the present disclosure provides a processor-implemented method for determination of a rocket configuration. The method includes measuring the acceleration of the rocket over a period of time associated with the flight of the rocket. The method also includes calculating an acceleration difference between the measured acceleration associated with the start of rocket motor burn-out and the measured acceleration associated with the end of rocket motor burn-out, as will be explained in greater detail below. The method further includes measuring an internal temperature of the rocket and selecting a delta acceleration threshold based on the measured temperature. As will be appreciated in light of this disclosure, the delta acceleration threshold for a given rocket refers to the acceleration difference between the measured acceleration associated with a start of rocket motor burn-out and the measured acceleration associated with an end of rocket motor burn-out, for that rocket. As will be further appreciated in light of this disclosure, the internal temperature of a given rocket uniquely correlates relatively well to the corresponding delta acceleration threshold for that rocket. So, if the temperature is known, then an expected delta acceleration threshold can be looked-up or otherwise identified. The method further includes comparing the calculated acceleration difference to the selected delta acceleration threshold, to estimate the rocket configuration. The estimated rocket configuration is used by guidance and control circuitry to select autopilot parameters for the rocket.

Another example embodiment of the present disclosure provides a system for determination of a rocket configuration. The system includes an accelerometer configured to measure the acceleration of the rocket over a period of time associated with the flight of the rocket. The system also includes a delta calculation circuit configured to calculate an acceleration difference between the measured acceleration associated with the start of rocket motor burn-out and the measured acceleration associated with the end of rocket motor burn-out. The system further includes a temperature sensor configured to measure an internal temperature of the rocket and a threshold selection circuit configured to select a delta acceleration threshold based on the measured internal temperature. The system further includes a comparator circuit configured to compare the calculated acceleration difference to the selected delta acceleration threshold, to estimate the rocket configuration.

Yet another example embodiment of the present disclosure provides computer readable storage medium having instructions encoded thereon that, when executed by one or more processors, result in operations for determination of a rocket configuration. The operations include measuring the acceleration of the rocket over a period of time associated with the flight of the rocket. The operations also include calculating an acceleration difference between the measured acceleration associated with the start of rocket motor burn-out and the measured acceleration associated with the end of rocket motor burn-out. The operations further include measuring an internal temperature of the rocket and selecting a delta acceleration threshold based on the measured temperature. The operations further include comparing the calculated acceleration difference to the selected delta acceleration threshold, to estimate the rocket configuration. The estimated rocket configuration is used by guidance and control circuitry to select autopilot parameters for the rocket.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
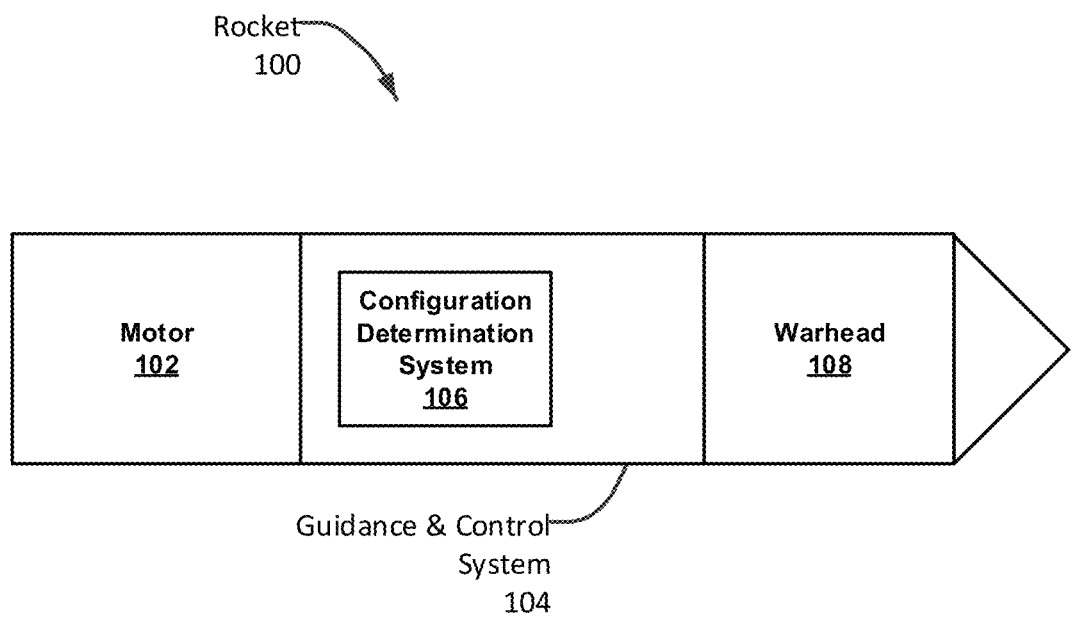
FIG. 1 illustrates components of a rocket, configured in accordance with certain of the embodiments disclosed herein.

Although the following Detailed Description will proceed with reference being made to illustrative embodiments, many alternatives, modifications, and variations thereof will be apparent to those skilled in the art.

DETAILED DESCRIPTION

Generally, this disclosure provides techniques for automated determination of the configuration of a rocket, including, for example, the type or class of warhead. The determination can be made in-flight and without human intervention. The determination is based on measurements of the rocket acceleration and temperature during the burn-out phase of the rocket motor. Different types of rocket warheads can vary significantly in mass and aerodynamic properties resulting in large differences in peak acceleration, speed, and atmospheric drag forces. Launch conditions can also affect these variables, however, rendering them unsuitable, on their own, for automated warhead determination. The disclosed techniques, however, take advantage of the fact that the drag force immediately before and after rocket motor burn-out remains relatively constant, and therefore, the measured deceleration of the rocket during burn-out remains relatively constant for a given type of warhead (at a given temperature) and can be used for estimation of the war head type. It should be understood that the use of the term rocket is intended to cover any form of precision guided munition.

In accordance with an embodiment, the disclosed techniques can be implemented, for example, in a computing system or a software product executable or otherwise controllable by such systems. The computing system can be on-board the rocket or have communications to an external computing system. The system or product is configured to measure the acceleration of the rocket over a period of time associated with the flight of the rocket. The system is also configured to calculate an acceleration difference between the measured acceleration associated with the start of rocket motor burn-out and the measured acceleration associated with the end of rocket motor burn-out. The system is further configured to measure an internal temperature of the rocket and to select a delta acceleration threshold based on the measured internal temperature. The system is further configured to compare the calculated acceleration difference to the selected delta acceleration threshold, to estimate the rocket configuration based on the delta acceleration of the rocket during the burn-out phase of the rocket motor, at a measured temperature.

As will be appreciated in light of this disclosure, the techniques provided herein may provide for automated determination of a rocket configuration without the requirement for external, manually operated switches, which are susceptible to operator error, particularly under stressful combat situations. The disclosed techniques can also be implemented with reduced complexity in an efficient manner, employing relatively low cost components including an accelerometer, temperature sensor, and processing circuitry. Additionally, at least some portions of these techniques can be implemented in hardware or software or a combination thereof.

FIG. 1 illustrates components of a rocket 100, configured in accordance with certain of the embodiments disclosed herein. The guided munition, rocket or missile 100 is shown to include a motor 102, guidance and control system 104, and warhead 108. The guidance and control system 104 is shown to further include a configuration determination system 106. The motor 102 contains fuel that is ignited at launch and burns until consumed (e.g., at burn-out) to provide propulsion for the rocket which causes the rocket to undergo acceleration. The guidance and control system 104, which generally sits atop the motor section, includes the control circuitry and related components configured to guide the rocket towards an intended target. The warhead 108, which is generally affixed to the top of the rocket assembly, provides the explosives. Different types or classes of warhead 108 may be installed on the rocket to provide different configurations with varying destructive capabilities. These different warheads will generally have varying masses and aerodynamic properties.

In some embodiments, the configuration determination system 106 may be integrated into the guidance & control system 104, and is configured to provide automated determination of the rocket configuration (e.g., the type of warhead). The determination is based on measurements of the rocket acceleration and temperature during the burn-out phase of the motor, as will be described in greater detail below.

Figure 2:
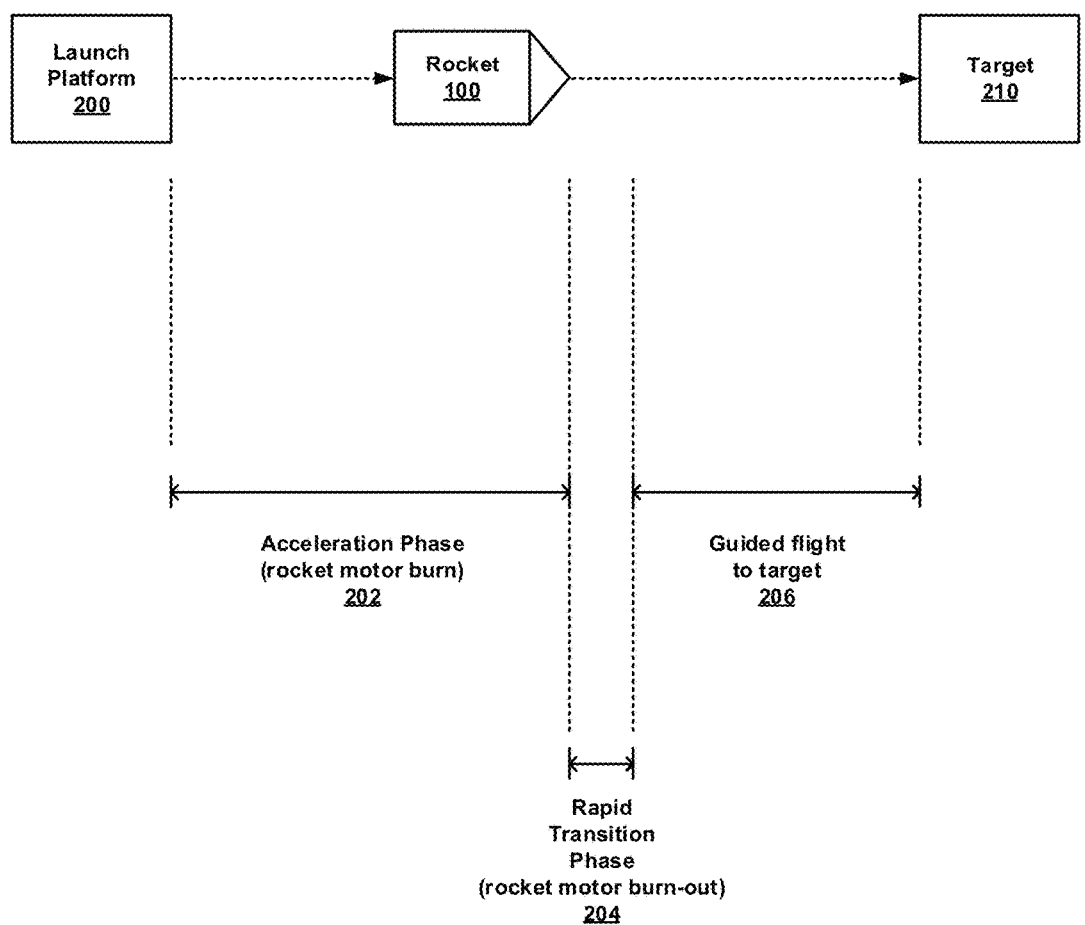
FIG. 2 illustrates segments of a rocket flight path, in accordance with certain of the embodiments disclosed herein.

FIG. 2 illustrates segments of a rocket flight path, in accordance with certain of the embodiments disclosed herein. The rocket 100 is launched from a platform 200, such as, for example, a fixed wing or rotary wing aircraft, and travels towards an intended target 210. As the rocket motor section 102 burns, the rocket accelerates through an acceleration phase 202, which continues until the motor burns out. At the point of motor burn-out, the rocket undergoes a rapid transition from acceleration to deceleration (burn-out phase 204) as propulsion ceases and atmospheric drag becomes the primary force acting on the rocket. The rocket then enters a final phase 206 where the deceleration levels off and the rocket is guided (for example, through manipulation of flight surfaces) to the target.

Figure 3:
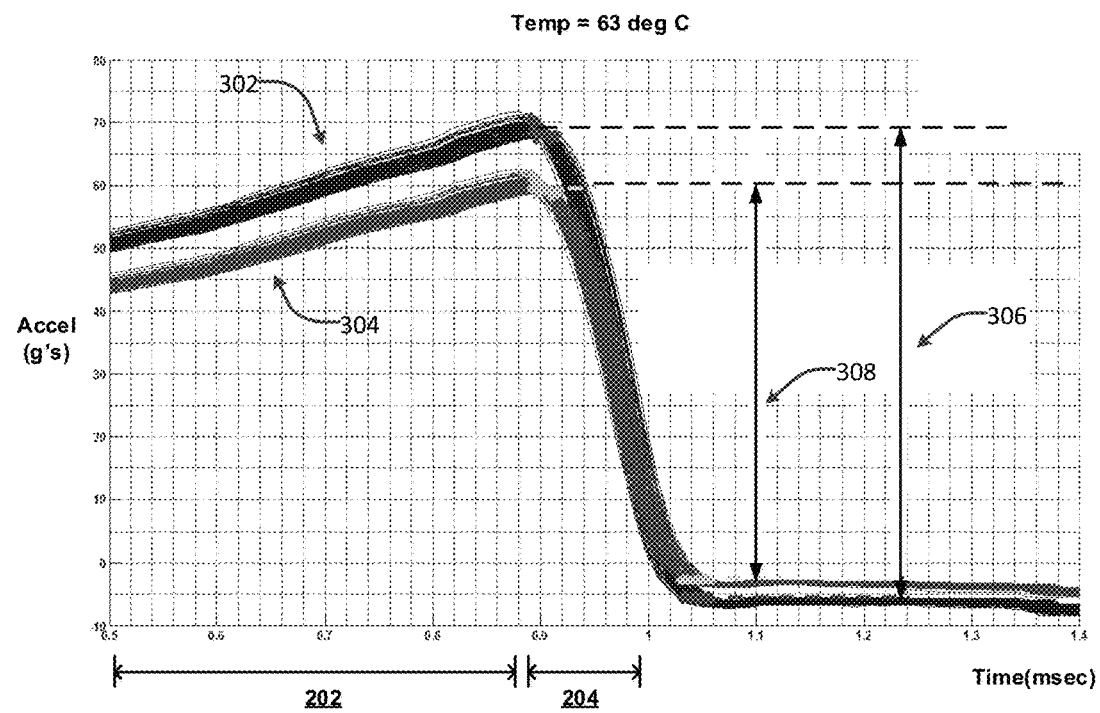
FIG. 3 illustrates plots of rocket acceleration versus time and temperature for two rocket configurations, in accordance with certain of the embodiments disclosed herein.
Figure 3:
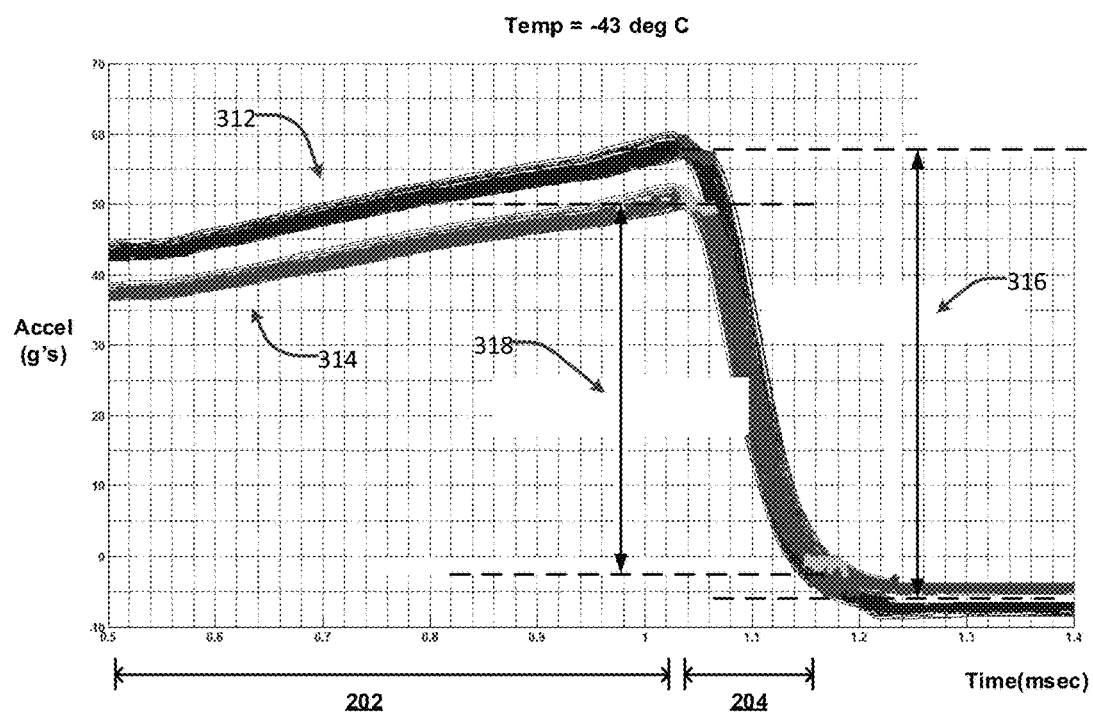

FIG. 3 illustrates plots of rocket acceleration versus time and temperature for two rocket configurations, in accordance with certain of the embodiments disclosed herein. The plots show rocket acceleration in g's (g-force) versus time in milliseconds. A negative acceleration value indicates deceleration. The top graph corresponds to temperature conditions (internal to the rocket) of 63 degrees Celsius, and the bottom graph corresponds to a temperature of −43 degrees Celsius. Turning attention first to the top graph, the rocket acceleration is plotted for the case of two different types of warheads. One plot 302, in this example, corresponds to an M151 warhead, and the other plot 304 corresponds to an M282 warhead. These particular warheads are used as an illustrative example and it will be appreciated that the techniques disclosed herein are applicable to other types of warheads or payloads.

As can be seen, the rocket acceleration increases for both warhead types, as the fuel burns, during the acceleration phase 202, after which a rapid decrease in acceleration occurs during the motor burn-out phase 204. While the peak rocket acceleration can vary widely depending on mass, type of launch platform, altitude, launch platform speed, and many other factors, the change in acceleration at the end of burnout remains relatively constant for a given class of warhead, at a given temperature. The change in acceleration, or delta acceleration, during phase 204 is shown for each warhead type, 306 for warhead M151, and 308 for warhead M282. As can be seen, the M282, which is the heavier warhead, is associated with a smaller delta acceleration.

With reference now to the bottom graph, the same information is presented for the lower temperature case. Here, plot 312 corresponds to the M151 and plot 314 corresponds to the M282. As can be seen, the delta acceleration values 316 and 318 are reduced at the lower temperature; however, the M282 is still associated with the smaller delta acceleration compared to the M151.

Figure 4:
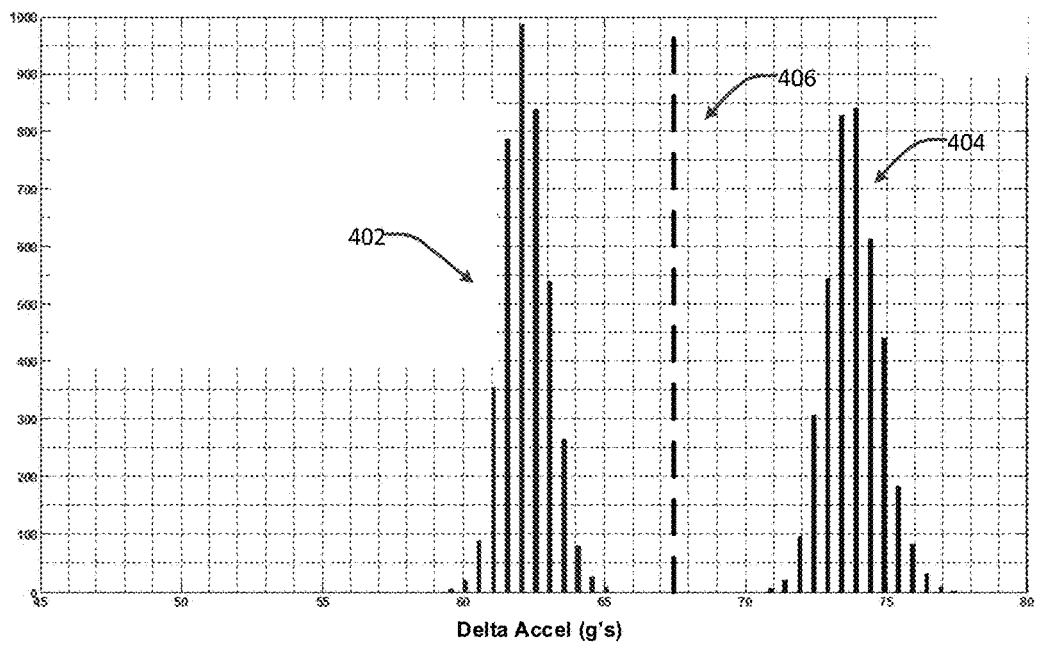
FIG. 4 illustrates histograms of delta acceleration, for two rocket configurations, at different temperatures, in accordance with certain of the embodiments disclosed herein.
Figure 4:
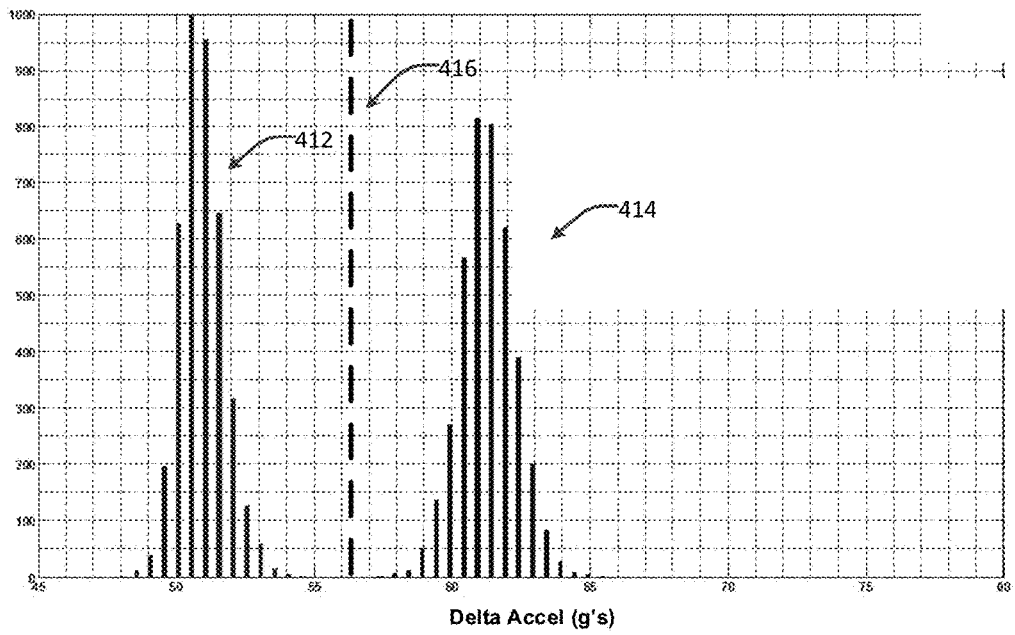

FIG. 4 illustrates histograms of delta acceleration, for two rocket configurations, at different temperatures, in accordance with certain of the embodiments disclosed herein. As can be seen, comparing the top and bottom graphs, the internal rocket temperature has an effect on the delta acceleration values. These values, however, remain clustered in relatively distinct groupings corresponding to the rocket configuration (e.g., warhead type). For example cluster 402 (for the M282 warhead) is well separated from cluster 404 (for the M151) warhead. A delta acceleration threshold 406 of approximately 68 g's, in this example, could be used to classify the warhead. A similar situation exists at the lower temperature example in the bottom graph, where cluster 412 (for the M282 warhead) is well separated from cluster 414 (for the M151 warhead), and a delta acceleration threshold 416 of 56 g's could be employed for classification. Thus, given knowledge of temperature, an appropriate delta acceleration threshold can be selected to provide automated determination of warhead type.

Figure 5:
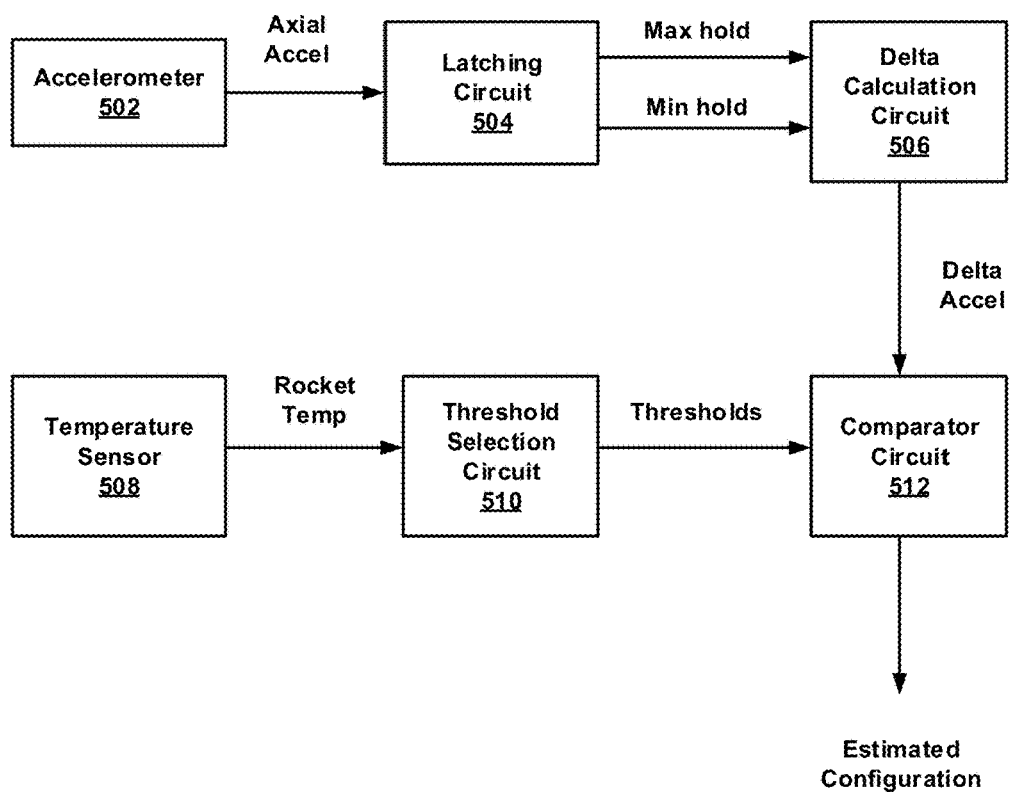
FIG. 5 is a more detailed block diagram of a rocket configuration determination system, configured in accordance with certain of the embodiments disclosed herein.

FIG. 5 is a more detailed block diagram of a rocket configuration determination system 106a, configured in accordance with certain of the embodiments disclosed herein. The rocket configuration is associated with a class of warhead affixed to the rocket. The rocket configuration determination system 106a is shown to include an accelerometer 502, a latching circuit 504, a delta calculation circuit 506, a temperature sensor 508, a threshold selection circuit 510, and a comparator circuit 512.

The accelerometer 502 is configured to measure the acceleration of the rocket (e.g., axial acceleration along the direction of travel) over a period of time associated with the flight of the rocket after launch. The latching circuit 504 is configured to determine a maximum and a subsequent minimum of the measured accelerations. For example, the latching circuit may detect and store these values as a "max hold" and a "min hold." In some embodiments, the latching circuit may be further configured to detect the subsequent minimum acceleration within a selected time period after the maximum acceleration.

The delta calculation circuit 506 is configured to calculate an acceleration difference between the measured acceleration associated with the start of rocket motor burn-out and the measured acceleration associated with the end of rocket motor burn-out. In some embodiments, the delta calculation circuit is configured to calculate this acceleration difference between the based on the maximum acceleration and the minimum acceleration (e.g., the max hold value minus the min hold value).

The temperature sensor 508 is configured to measure an internal temperature of the rocket. In some embodiments, the temperature sensor obtains the internal temperature measurement within the guidance and control circuit module of the rocket, which may be representative of the temperatures of the rocket that are associated with fuel burn rate characteristics. In some embodiments, the temperature may be obtained at any other suitable location within the rocket.

The threshold selection circuit 510 is configured to select a delta acceleration threshold based on the measured internal temperature. For example, in some embodiments, a database or look-up table may be employed to store delta acceleration thresholds as a function of temperature for particular rocket configurations of interest. The comparator circuit 512 is configured to compare the calculated acceleration difference to the selected delta acceleration threshold, to estimate the rocket configuration. In some embodiments, the estimated rocket configuration may then be provided to the rocket's guidance and control system/circuit 104 to enable selection of autopilot parameters for the remainder of the flight. Such parameters may depend, for example, on Mach speed and dynamic pressure estimates of the rocket, which are determined, at least in part, by the type of warhead.

Figure 6:
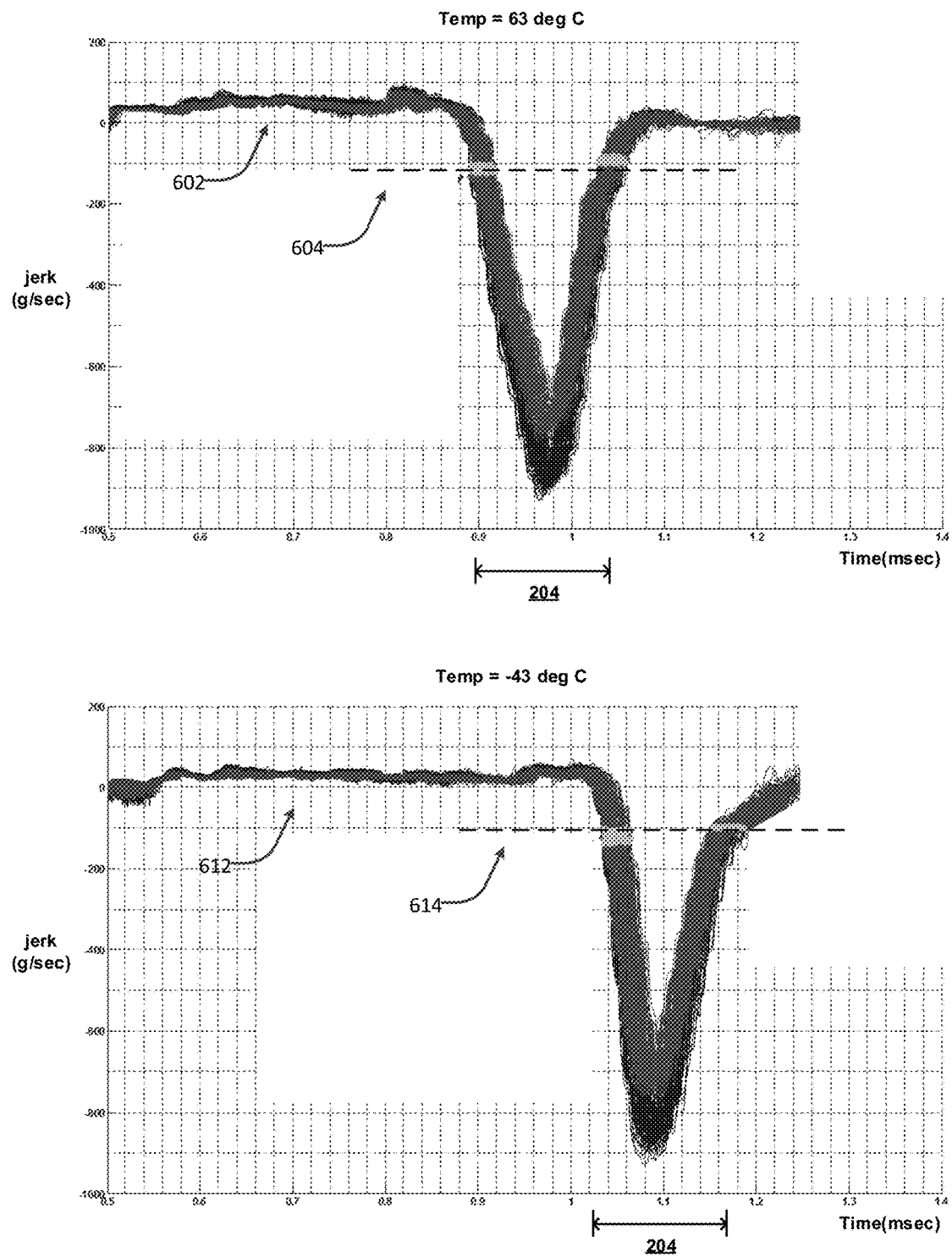
FIG. 6 illustrates plots of rocket jerk versus time and temperature, in accordance with certain of the embodiments disclosed herein.

FIG. 6 illustrates plots of rocket jerk versus time and temperature, in accordance with certain of the embodiments disclosed herein. The rocket jerk signal, which is defined herein as the first derivative of the rocket acceleration, represents the change in acceleration as a function of time (e.g., g's per second) and may be useful for identification of the motor-burn out phase, in some embodiments, as will be described in greater detail below. The jerk signal 602 and 612 can be seen in these plots to undergo relatively sharp dip during the motor burn-out phase 204. As such a jerk threshold value 604, 614 may be selected to determine the motor burn-out phase 204.

Figure 7:
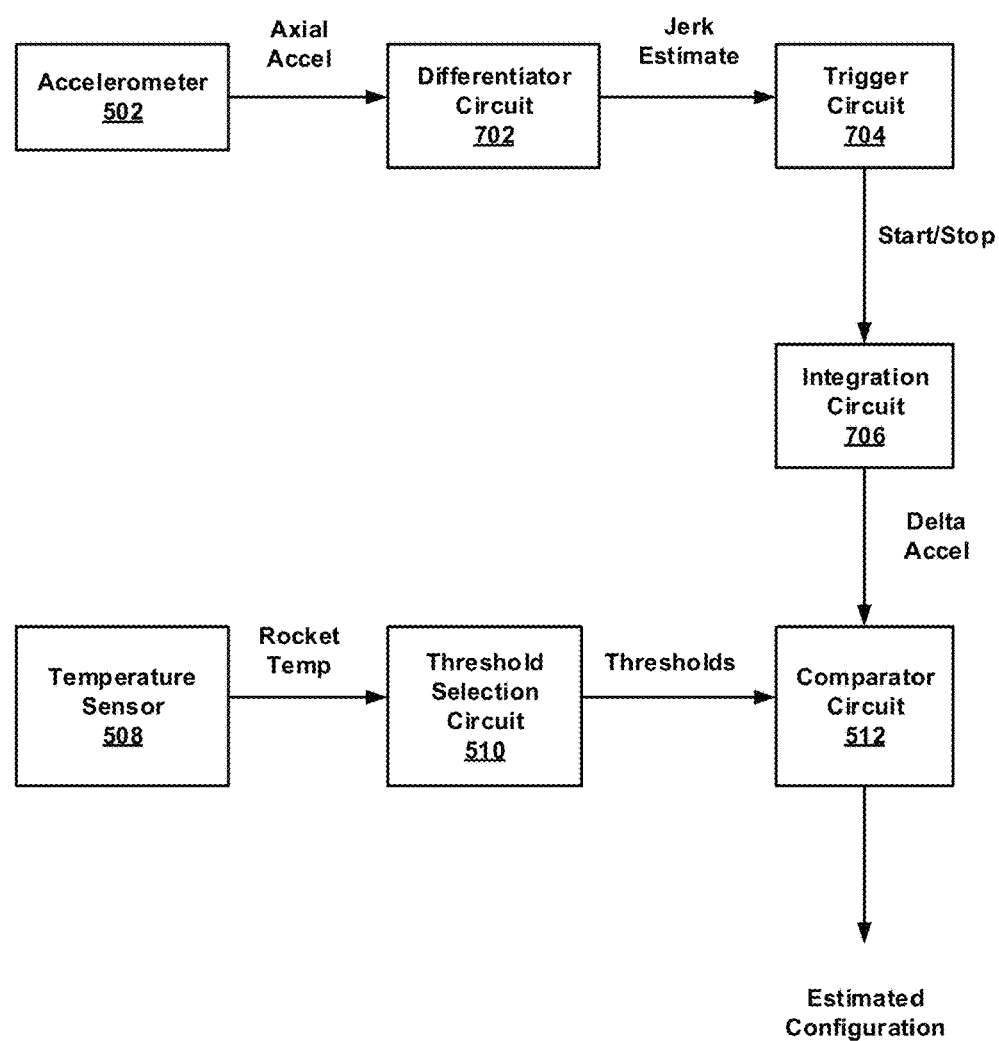
FIG. 7 is a more detailed block diagram of another rocket configuration determination system, configured in accordance with certain of the embodiments disclosed herein.

FIG. 7 is a more detailed block diagram of another rocket configuration determination system 106b, configured in accordance with certain of the embodiments disclosed herein. The rocket configuration determination system 106b is configured to employ the rocket jerk signal and is shown to include an accelerometer 502, a differentiator circuit 702, a trigger circuit 704, an integration circuit 706, a temperature sensor 508, a threshold selection circuit 510, and a comparator circuit 512.

The accelerometer 502, as previously described, is configured to measure the acceleration of the rocket over the flight travel time after launch. The differentiator circuit 702 is configured to calculate a first derivative of the measured acceleration to generate the jerk signal 602, 612.

The trigger circuit 704 is configured to determine a first time associated with the start of rocket motor burn-out based on the jerk signal decreasing below a selected jerk threshold 604, 614. The trigger circuit is further configured to determine a second subsequent time associated with the end of rocket motor burn-out based on the jerk signal increasing back above the selected jerk threshold.

The integration circuit 706 is configured to integrate the jerk signal between the first time and the second time, when the jerk signal is below the threshold, to estimate the acceleration difference or delta acceleration associated with the rocket motor burn-out.

As previously described, the temperature sensor 508 is configured to measure an internal temperature of the rocket, and the threshold selection circuit 510 is configured to select a delta acceleration threshold based on the measured internal temperature. The comparator circuit 512 is configured to compare the calculated acceleration difference to the selected delta acceleration threshold, to estimate the rocket configuration. In some embodiments, the estimated rocket configuration may then be provided to the rocket's guidance and control system/circuit 104 to enable selection of autopilot parameters for the remainder of the flight.

Methodology

Figure 8:
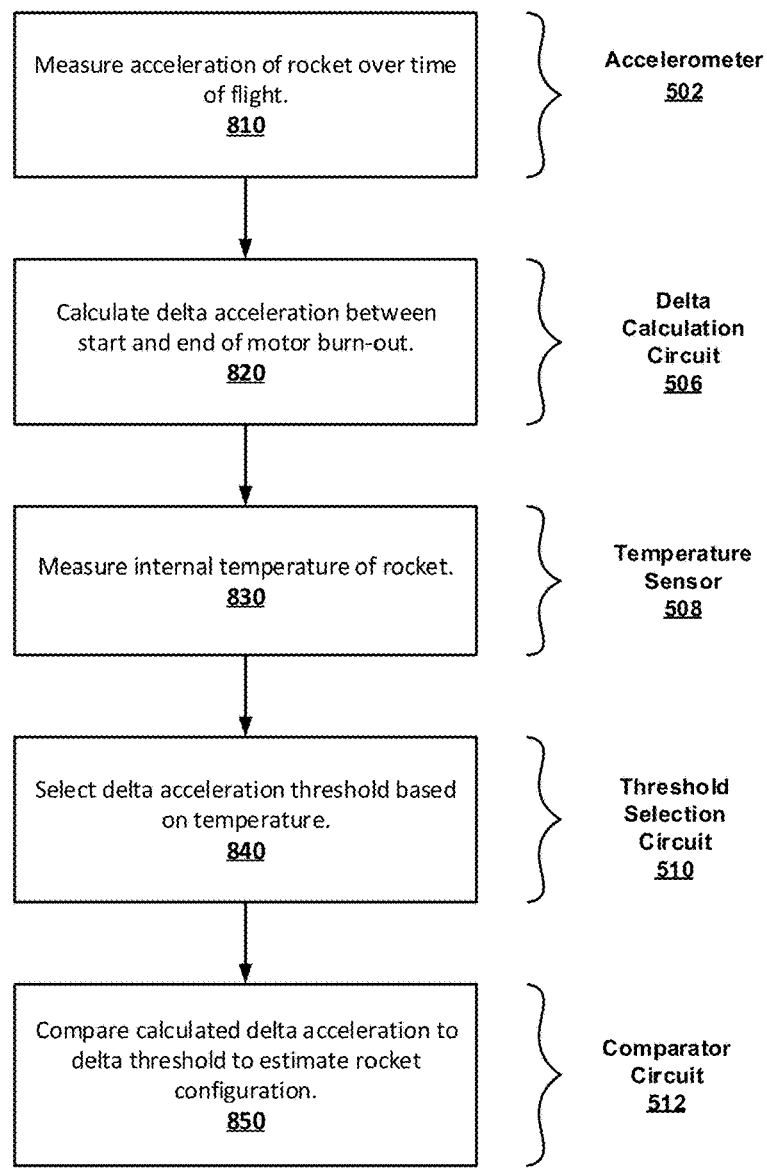
FIG. 8 is a flowchart illustrating a methodology for determination of a rocket configuration, in accordance with certain of the embodiments disclosed herein.

FIG. 8 is a flowchart illustrating an example method 800 for determination of a rocket configuration, in accordance with an embodiment of the present disclosure. As can be seen, example method 800 includes a number of phases and sub-processes, the sequence of which may vary from one embodiment to another. However, when considered in the aggregate, these phases and sub-processes form a process for automated rocket configuration determination in accordance with certain of the embodiments disclosed herein. These embodiments can be implemented, for example using the system architecture illustrated in FIGS. 5 and 7 as described above. However other system architectures can be used in other embodiments, as will be apparent in light of this disclosure. To this end, the correlation of the various functions shown in FIG. 8 to the specific components illustrated in FIGS. 5 and 7 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 800. Thus other embodiments may have fewer or more modules and/or sub-modules depending on the granularity of implementation. Numerous variations and alternative configurations will be apparent in light of this disclosure.

As illustrated in FIG. 8, in one embodiment, method 800 for rocket configuration determination commences, at operation 810, by measuring the acceleration of the rocket over a period of time associated with the flight of the rocket, for example from launch to impact.

At operation 820, an acceleration difference (or delta) is calculated between the measured acceleration associated with the start of the burn-out of the rocket motor and the measured acceleration associated with the end of the burn-out. In some embodiments, the delta is estimated as a difference between the maximum acceleration and a subsequent minimum acceleration (e.g., maximum deceleration). In some embodiments, the delta is estimated from the derivative of the acceleration (e.g., the change in acceleration or jerk of the rocket), as described previously.

Next, at operation 830, a temperature measurement is obtained from an internal region of the rocket, for example in the guidance and control module. The temperature provides an indication of the burn rate of the rocket fuel, which in turn affects the relationship between delta acceleration and the rocket configuration. At operation 840, a delta acceleration threshold is selected based on the measured internal temperature.

At operation 850, the calculated acceleration difference is compared to the selected delta acceleration threshold, to estimate the rocket configuration (e.g., the type of warhead or payload). If the calculated acceleration difference is greater than the delta threshold, one type of warhead may be assumed, otherwise an alternative type of warhead may be assumed.

Of course, in some embodiments, additional operations may be performed, as previously described in connection with the system. These additional operations may include, for example, providing the estimated rocket configuration to guidance and control circuitry of the rocket to enable selection of autopilot parameters.

Example System

Figure 9:
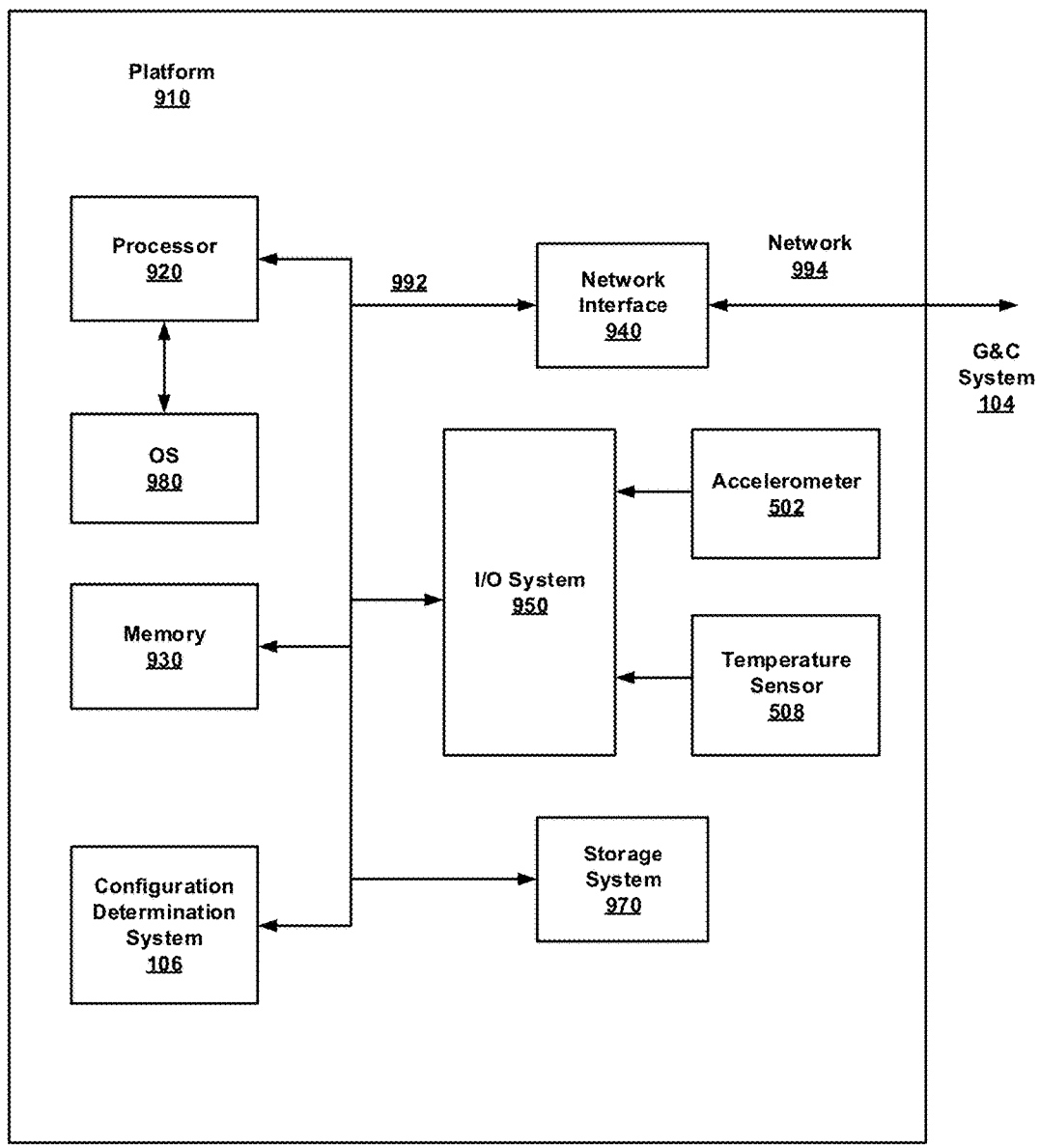
FIG. 9 is a block diagram schematically illustrating a system platform configured to determine a rocket configuration, configured in accordance with certain of the embodiments disclosed herein.

FIG. 9 illustrates an example system 900 configured to determine the configuration (e.g., warhead type) of a rocket, as described herein. In some embodiments, system 900 comprises a platform 910 which may host, or otherwise be incorporated into a guidance and control module of the rocket.

In some embodiments, platform 910 may comprise any combination of a processor 920, a memory 930, a network interface 940, an input/output (I/O) system 950, accelerometer 502, temperature sensor 508, and a storage system 970, along with configuration determination system 106, as described herein. As can be further seen, a bus and/or interconnect 992 is also provided to allow for communication between the various components listed above and/or other components not shown. Platform 910 can be coupled to a network 994 through network interface 940 to allow for communications with other computing systems and platforms on the rocket, or with other ground or air based resources, for example through radio communication. Other componentry and functionality not reflected in the block diagram of FIG. 9 will be apparent in light of this disclosure, and it will be appreciated that other embodiments are not limited to any particular hardware configuration.

Processor 920 can be any suitable processor, and may include one or more coprocessors or controllers, to assist in control and processing operations associated with system 900. In some embodiments, the processor 920 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 920 may be implemented as a complex instruction set computer (CISC) or a reduced instruction set computer (RISC) processor.

Memory 930 can be implemented using any suitable type of digital storage including, for example, flash memory and/or random access memory (RAM). In some embodiments, the memory 930 may include various layers of memory hierarchy and/or memory caches as are known to those of skill in the art. Memory 930 may be implemented as a volatile memory device such as, but not limited to, a RAM, dynamic RAM (DRAM), or static RAM (SRAM) device. Storage system 970 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 970 may comprise technology to increase the storage performance enhanced protection for valuable digital media when multiple hard drives are included.

Processor 920 may be configured to execute an Operating System (OS) 980 which may comprise any suitable operating system, such as, for example, Google Android (Google Inc., Mountain View, Calif.), Microsoft Windows (Microsoft Corp., Redmond, Wash.), Linux, Apple OS X (Apple Inc., Cupertino, Calif.) and/or various real-time operating systems. As will be appreciated in light of this disclosure, the techniques provided herein can be implemented without regard to the particular operating system provided in conjunction with system 900, and therefore may also be implemented using any suitable existing or subsequently-developed platform.

Network interface circuit 940 can be any appropriate network chip or chipset which allows for wired and/or wireless connection between other components of computer system 900 and/or network 994, thereby enabling system 900 to communicate with other local and/or remote computing systems, servers, and/or resources. Wired communication may conform to existing (or yet to developed) standards, such as, for example, Ethernet. Exemplary wireless networks may include, but are not limited to, satellite networks.

I/O system 950 may be configured to interface between various I/O devices and other components of computer system 900. I/O devices may include, but not be limited to, accelerometers 502, temperature sensors 508, and other devices not shown such as a test port, keyboard and display element.

It will be appreciated that in some embodiments, the various components of the system 900 may be combined or integrated in a system-on-a-chip (SoC) architecture. In some embodiments, the components may be hardware components, firmware components, software components or any suitable combination of hardware, firmware or software.

Configuration determination system 106 provides automated determination of a rocket configuration based on acceleration changes during the rocket motor burn-out and further based on the rocket's internal temperature. The rocket configuration is associated with a class of warhead affixed to the rocket, in accordance with embodiments of the present disclosure. Configuration determination system 106 may include any or all of the components illustrated in FIGS. 5 and 7 and described above. Configuration determination system 106 can be implemented or otherwise used in conjunction with a variety of suitable software and/or hardware that is coupled to or that otherwise forms a part of system 900.

In various embodiments, system 900 may be implemented as a wireless system, a wired system, or a combination of both. When implemented as a wireless system, system 900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 900 may include components and interfaces suitable for communicating over wired communications media, such as input/output adapters, physical connectors to connect the input/output adaptor with a corresponding wired communications medium, a network interface card (NIC), and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the rocket configuration determination methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. The computer software applications disclosed herein may include any number of different modules, sub-modules, or other components of distinct functionality, and can provide information to, or receive information from, still other components. Other componentry and functionality not reflected in the illustrations will be apparent in light of this disclosure, and it will be appreciated that other embodiments are not limited to any particular hardware or software configuration. Thus in other embodiments system 900 may comprise additional, fewer, or alternative subcomponents as compared to those included in the example embodiment of FIG. 9.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hardcoded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a processor-implemented method for determination of a rocket configuration. The method includes obtaining acceleration of the rocket over a period of time associated with flight of the rocket. The method also includes calculating an acceleration difference between the obtained acceleration associated with a start of rocket motor burn-out and the obtained acceleration associated with an end of rocket motor burn-out. The method further includes measuring an internal temperature of the rocket; selecting a delta acceleration threshold based on the measured internal temperature; and comparing the calculated acceleration difference to the selected delta acceleration threshold, to determine the rocket configuration. In some cases, the method further includes determining a maximum of the obtained accelerations; determining a minimum of the obtained accelerations; and calculating the acceleration difference between the maximum acceleration and the minimum acceleration. In some such cases, the minimum of the obtained accelerations occurs within a selected time period after the maximum acceleration. In some cases, the calculation of acceleration difference includes calculating a first derivative of the obtained acceleration to generate a jerk signal; determining a first time associated with the start of rocket motor burn-out based on the jerk signal decreasing below a selected jerk threshold; determining a second time associated with the end of rocket motor burn-out based on the jerk signal increasing above the selected jerk threshold; and integrating the jerk signal between the first time and the second time to estimate the acceleration difference. In some cases, the rocket configuration is associated with a class of warhead affixed to the rocket. In some cases, the method further includes providing the estimated rocket configuration to guidance and control circuitry of the rocket to enable selection of autopilot parameters. In some cases, the temperature measurement is associated with an internal temperature of a guidance and control circuit module of the rocket.

Another example embodiment of the present disclosure provides a system for determination of a rocket configuration. The system includes an accelerometer to measure acceleration of the rocket over a period of time associated with flight of the rocket. The system also includes a delta calculation circuit to calculate an acceleration difference between the measured acceleration associated with a start of rocket motor burn-out and the measured acceleration associated with an end of rocket motor burn-out. The system further includes a temperature sensor to measure an internal temperature of the rocket; a threshold selection circuit to select a delta acceleration threshold based on the measured internal temperature; and a comparator circuit to compare the calculated acceleration difference to the selected delta acceleration threshold, to determine the rocket configuration. In some cases, the system further includes a latching circuit to determine a maximum of the measured accelerations and a minimum of the measured accelerations, wherein the delta calculation circuit is further to calculate the acceleration difference between the maximum acceleration and the minimum acceleration. In some such cases, the minimum of the measured accelerations occurs within a selected time period after the maximum acceleration. In some cases the system further includes a differentiator circuit to calculate a first derivative of the measured acceleration to generate a jerk signal; a trigger circuit to determine a first time associated with the start of rocket motor burn-out based on the jerk signal decreasing below a selected jerk threshold; the trigger circuit further to determine a second time associated with the end of rocket motor burn-out based on the jerk signal increasing above the selected jerk threshold; and an integration circuit to integrate the jerk signal between the first time and the second time to estimate the acceleration difference. In some cases, the rocket configuration is associated with a class of warhead affixed to the rocket. In some cases, the rocket further comprises a guidance and control circuit to receive the estimated rocket configuration to enable selection of autopilot parameters. In some cases, the temperature sensor is to obtain the internal temperature measurement of a guidance and control circuit module of the rocket.

Yet another example embodiment of the present disclosure provides computer readable storage medium having instructions encoded thereon that, when executed by one or more processors, result in operations for determination of a rocket configuration. The operations include measuring acceleration of the rocket over a period of time associated with flight of the rocket. The operations also include calculating an acceleration difference between the measured acceleration associated with a start of rocket motor burn-out and the measured acceleration associated with an end of rocket motor burn-out. The operations further include measuring an internal temperature of the rocket; selecting a delta acceleration threshold based on the measured internal temperature; and comparing the calculated acceleration difference to the selected delta acceleration threshold, to determine the rocket configuration. In some cases, the calculation of acceleration difference further includes the operations of determining a maximum of the measured accelerations; determining a minimum of the measured accelerations; and calculating the acceleration difference between the maximum acceleration and the minimum acceleration. In some such cases, the minimum of the measured accelerations occurs within a selected time period after the maximum acceleration. In some cases, the calculation of acceleration difference further includes the operations of calculating a first derivative of the measured acceleration to generate a jerk signal; determining a first time associated with the start of rocket motor burn-out based on the jerk signal decreasing below a selected jerk threshold; determining a second time associated with the end of rocket motor burn-out based on the jerk signal increasing above the selected jerk threshold; and integrating the jerk signal between the first time and the second time to estimate the acceleration difference. In some cases, the rocket configuration is associated with a class of warhead affixed to the rocket. In some cases, the operations further include providing the estimated rocket configuration to guidance and control circuitry of the rocket to enable selection of autopilot parameters.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for determination of a rocket or missile configuration, the method comprising:
   obtaining, by a processor, acceleration of a rocket or missile over a period of time during flight of the rocket or missile;
   calculating, by the processor during the flight, an acceleration difference between the obtained acceleration associated with a start of motor burn-out and the obtained acceleration associated with an end of motor burn-out;
   measuring, by the processor during the flight, an internal temperature of the rocket or missile;
   selecting, by the processor during the flight, a delta acceleration threshold based on the measured internal temperature;
   comparing, by the processor during the flight, the calculated acceleration difference to the selected delta acceleration threshold to estimate the rocket or missile configuration; and
   providing the estimated rocket or missile configuration to guidance and control circuitry of the rocket or missile to enable selection of autopilot parameters.

2. The method of claim 1, wherein the calculation of acceleration difference comprises:
   determining a maximum of the obtained accelerations;
   determining a minimum of the obtained accelerations; and
   calculating the acceleration difference between the maximum acceleration and the minimum acceleration.

3. The method of claim 2, wherein the minimum of the obtained accelerations occurs within a selected time period after the maximum acceleration.

4. The method of claim 1, wherein the calculation of acceleration difference comprises:
   calculating a first derivative of the obtained acceleration to generate a jerk signal;
   determining a first time associated with the start of motor burn-out based on the jerk signal decreasing below a selected jerk threshold;

determining a second time associated with the end of motor burn-out based on the jerk signal increasing above the selected jerk threshold; and integrating the jerk signal between the first time and the second time to estimate the acceleration difference.

5. The method of claim 1, wherein the rocket or missile configuration is associated with a class of warhead affixed to the rocket or missile.

6. The method of claim 1, wherein the temperature measurement is associated with an internal temperature of a guidance and control circuit module of the rocket or missile.

7. A system for determination of a rocket or missile configuration, the system comprising:

an accelerometer to measure acceleration of a rocket or missile over a period of time during flight of the rocket or missile;

a delta calculation circuit to calculate an acceleration difference between the measured acceleration associated with a start of motor burn-out and the measured acceleration associated with an end of motor burn-out;

a temperature sensor to measure an internal temperature of the rocket or missile;

a threshold selection circuit to select a delta acceleration threshold based on the measured internal temperature;

a comparator circuit to compare the calculated acceleration difference to the selected delta acceleration threshold to estimate the rocket or missile configuration; and a guidance and control circuit configured to receive the estimated rocket or missile configuration to enable selection of autopilot parameters.

8. The system of claim 7, further comprising a latching circuit configured to determine a maximum of the measured accelerations and a minimum of the measured accelerations, wherein the delta calculation circuit is further to calculate the acceleration difference between the maximum acceleration and the minimum acceleration.

9. The system of claim 8, wherein the minimum of the measured accelerations occurs within a selected time period after the maximum acceleration.

10. The system of claim 7, further comprising:

a differentiator circuit configured to calculate a first derivative of the measured acceleration to generate a jerk signal;

a trigger circuit configured to determine a first time associated with the start of motor burn-out based on the jerk signal decreasing below a selected jerk threshold;

the trigger circuit further configured to determine a second time associated with the end of motor burn-out based on the jerk signal increasing above the selected jerk threshold; and an integration circuit configured to integrate the jerk signal between the first time and the second time to estimate the acceleration difference.

11. The system of claim 7, wherein the rocket or missile configuration is associated with a class of warhead affixed to the rocket or missile.

12. The system of claim 7, wherein the temperature sensor is configured to obtain the internal temperature measurement of a guidance and control circuit module of the rocket or missile.

13. At least one non-transitory computer readable storage medium having instructions encoded thereon that, when executed by one or more processors, result in the following operations for determination of a rocket or missile configuration, the operations comprising:

measuring acceleration of a rocket or missile over a period of time during flight of the rocket or missile;

calculating an acceleration difference between the measured acceleration associated with a start of motor burn-out and the measured acceleration associated with an end of motor burn-out;

measuring an internal temperature of the rocket or missile;

selecting a delta acceleration threshold based on the measured internal temperature;

comparing the calculated acceleration difference to the selected delta acceleration threshold, to estimate the rocket or missile configuration; and providing the estimated rocket or missile configuration to guidance and control circuitry of the rocket or missile to enable selection of autopilot parameters.

14. The computer readable storage medium of claim 13, wherein the calculation of acceleration difference further comprises the operations of:

determining a maximum of the measured accelerations;

determining a minimum of the measured accelerations; and calculating the acceleration difference between the maximum acceleration and the minimum acceleration.

15. The computer readable storage medium of claim 14, wherein the minimum of the measured accelerations occurs within a selected time period after the maximum acceleration.

16. The computer readable storage medium of claim 13, wherein the calculation of acceleration difference further comprises the operations of:

calculating a first derivative of the measured acceleration to generate a jerk signal;

determining a first time associated with the start of motor burn-out based on the jerk signal decreasing below a selected jerk threshold;

determining a second time associated with the end of motor burn-out based on the jerk signal increasing above the selected jerk threshold; and integrating the jerk signal between the first time and the second time to estimate the acceleration difference.

17. The computer readable storage medium of claim 13, wherein the rocket or missile configuration is associated with a class of warhead affixed to the rocket or missile.

* * * * *